Patented July 1, 1952

2,602,080

UNITED STATES PATENT OFFICE 2,602,080

METALLIZED ORTHO-HYDROXY MONOAZO DYESTUFFS

Harry W. Grimmel, Riegelsville, and Heinrich H. Bestehorn, Easton, Pa., assignors to General Aniline & Film Corporation, New York, N. Y., a corporation of Delaware No Drawing. Application October 22, 1947, Serial No. 781,483

4 Claims. (Cl. 260—151)

This invention relates to new metallized ortho hydroxy monoazo dyestuffs.

The new dyestuffs of the invention have the general formula:

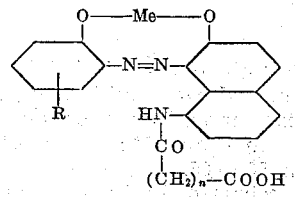

wherein R is hydrogen or an alkyl, alkoxy, hydroxy, halogen or nitro group, $n$ is a whole number from 2 to 8 and Me is a metal of atomic weight from 50 to 65.38, namely, vanadium, chromium, manganese, iron, cobalt, nickel, copper and zinc.

These new dyestuffs are capable of dyeing nylon (linear polyamide) in deep shades of excellent fastness to light and washing, the carboxy group promoting affinity of the dyestuffs for nylon. They may be applied to the fiber from a neutral or preferably a slightly acid bath. They are not as soluble in water as the known metallized acid monoazo dyestuffs carrying sulfonic acid groups, yet their solubility is sufficient such that no dispersion is necessary for their application. At higher temperatures their solubility is greatly increased. In contradistinction to the aforementioned dyestuffs carrying sulfonic acid groups, they have excellent build-up properties and are far superior in the wash-fastness of the dyeings. They are, at the same time, sufficiently similar in their dyeing properties to the dyestuffs now used in the trade to allow dyeings to be made with a mixture of the old and the new dyestuffs.

The preparation of the new dyestuffs can be accomplished in known way. The diazo compound from an unsulfonated-2-aminophenol which may be 2-aminophenol itself or those substituted in the nucleus by a group as defined by R above, for example, 1-methyl-2-hydroxy-3-aminobenzene, 1-methoxy-3-hydroxy-4-aminobenzene, 1-ethoxy-3-hydroxy-4-aminobenzene, 2-amino resorcinol, 4-chloro-2-amino-phenol, 4,6-dichloro-2-aminophenol, 4-nitro-2-aminophenol, 4,6-dinitro-2-aminophenol, 4-nitro-6-chloro-2-aminophenol, 5-nitro-4-methyl-2-aminophenol, and the like, is coupled in alkaline medium with a 7-carboxyalkylcarboylamino-1-naphthol of the general formula:

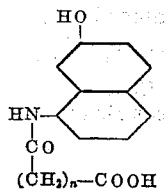

wherein $n$ is as given above, for example, 7-succinoylamido-1-naphthol, and the ortho-hydroxy monoazo dyestuff metallized.

Metallization of the ortho-hydroxy monoazo dyestuffs can be carried out by any of the methods known in the art. Depending upon the metal employed and the constitution of the dye, it may be accomplished in alkaline, neutral or acid medium. While we prefer to carry out the metallization in an aqueous medium, it can also be effected in an organic solvent, as for example, alcohol, or in mixtures of such solvents with one another or with water.

The coupler compounds of the above general formula can be prepared in known way. The monoamides of adipic, pimilic, suberic, azelaic and sebacic acids can be obtained by known methods for the preparation of the monoamides of the fatty acids, e. g., by reaction of the dibasic acid mono acid chloride with 7-amino-1-naphthol. The monoamides of succinic and glutaric acid may be obtained by first forming the succinimide and glutarimide of 7-amino-1-naphthol and then partially hydrolyzing the cyclic imide with aqueous caustic potash, the monoamide being precipitated in the free state by addition of hydrochloric acid. Annalen, 248, 158–159.

As previously mentioned, the dyeing of nylon with the new compounds is preferably carried out in a slightly acid bath. For this purpose there can be used acetic, formic and the like acids. Acidification follows the entering of the nylon into the hot dyebath which may be operated at temperatures ranging from about 190° F. to the boiling point. Advantageously, substances which in aqueous solution dissociate on heating to liberate free acid, e. g., ammonium thiocyanate, diethyl tartrate and the like, can be employed for the acidification of the dyebath. A specific illustration of the mode of dyeing nylon with the new dyestuffs is as follows. A solution of 0.15 part of one of the new dyestuffs is prepared by heating the dyestuff with 300 parts of water to the boiling point. 5 parts of nylon, preferably pre-treated in the usual manner with an aqueous solution of a suitable surface active agent to assist the dyeing, e. g., a 5% aqueous solution of the oleic acid amide of methyl taurine, sodium salt, is entered into the hot dyebath and heating continued. After 15 minutes, 5 parts of 1% acetic acid solution is added and a like amount after another 15 minutes, the bath being slightly acid after these additions. After 1 hour total heating time the nylon is removed from the dyebath, rinsed in warm water, and soaped by immersing it in a hot solution of 5 parts of a 10% green soap solution in 300 parts of water. The dyed nylon is again rinsed and then dried and conditioned in the usual manner.

The invention is further illustrated by the following specific examples to which, however, it is not intended that it be limited.

Example 1

14.35 grams 4-chloro-2-aminophenol is diazotized in the usual manner, for example, by dissolving it in 250 ml. water and 28 ml. hydrochloric acid (conc.), cooling and adding 6.9 grams of sodium nitrite as a 30% aqueous solution. The diazo solution is added to a cool (5–10° C.) solution of 28.5 grams 1-succinoyl-amido-7-naphthol in 400 ml. water and 55 ml. aqueous caustic soda solution (30%). The coupling progresses slowly. After about 5 hours the greater part of the dyestuff is precipitated. The precipitation is completed by salting out for which about 20–25% of common salt on the volume of the coupling is added. The dyestuff is isolated by filtration. The paste of the dyestuff is dispersed in 500 ml. water contained in a vessel provided with a reflux condenser. 23.8 grams cobaltous chloride crystals (6H₂O) is dissolved in 130 ml. water and 140 ml. aqueous ammonia (28%) added thereto. The solution thus obtained is added to the dyestuff suspension and the whole heated gradually to 80–90° C. The formation of the cobalt complex compound is substantially complete at the lower temperatures, but to ensure completion of the reaction the mixture is kept at 80–90° C. for several hours, e. g., 3 hours. The reaction mixture is allowed to cool to room temperature. The excess ammonia is then neutralized to a pH of 6.8 in the mixture by the addition of acetic acid.

The cobalt dyestuff is filtered from the mother liquor, washed on the filter with a small amount of water, dried and ground. It is a violet black compound of the probable formula:

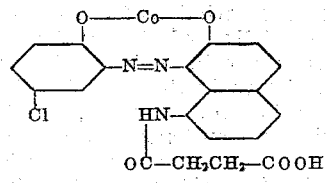

and dyes nylon a dark grey shade.

Example 2

18.8 grams 4-nitro-6-chlor-2-aminophenol is diazotized in known way by sludging in 250 ml. water, adding 28 ml. hydrochloric acid (conc.) and then, at a temperature of 10–15° C., rapidly adding 6.9 grams sodium nitrite as a 30% aqueous solution. The diazo suspension is coupled with 1-succinoylamido-7-naphthol and the dyestuff metallized following the procedure of Example 1, employing an aliquot portion of copper sulfate. The copper complex compound has the probable formula:

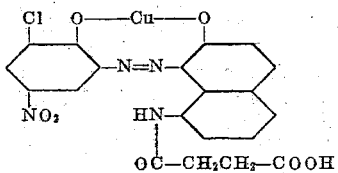

and dyes nylon a violet shade.

Example 3

The nickel complex compound of the dyestuff of Example 2 is obtained following the procedure therein described, using an aliquot portion of nickelous sulfate in place of the copper salt. The dyestuff has the probable formula:

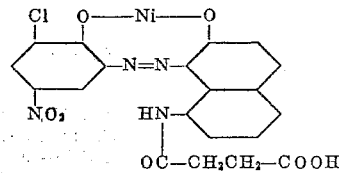

and dyes nylon a green shade.

We claim:

1. A metallized ortho-hydroxy monoazo dyestuff of the general formula:

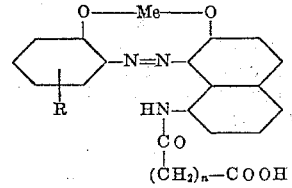

wherein R is a member selected from the group consisting of hydrogen and the alkyl, alkoxy, hydroxy, halogen and nitro groups, $n$ is a whole number from 2 to 8 and Me is a metal of atomic weight from 50 to 65.38.

2. The cobalt ortho-hydroxy monoazo dyestuff of the formula:

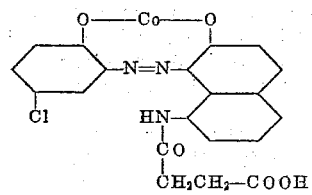

3. The copper ortho-hydroxy monoazo dyestuff of the formula:

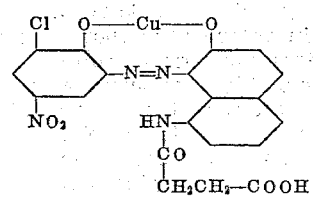

4. The nickel ortho-hydroxy monoazo dyestuff of the formula:

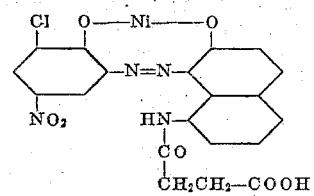

HARRY W. GRIMMEL.
HEINRICH H. BESTEHORN.

REFERENCES CITED

The following references are of record in the file of this patent:

UNITED STATES PATENTS

| Number | Name | Date |
|---|---|---|
| 1,411,245 | Geldermann et al. | Mar. 28, 1922 |
| 2,189,262 | Fleischhauer | Feb. 6, 1940 |
| 2,374,106 | Kvalnes et al. | Apr. 17, 1945 |

FOREIGN PATENTS

| Number | Country | Date |
|---|---|---|
| 543,198 | Great Britain | Feb. 13, 1942 |